Jan. 3, 1933.  W. B. ELMER ET AL  1,892,798
CABLE RIDER
Filed Aug. 3, 1931
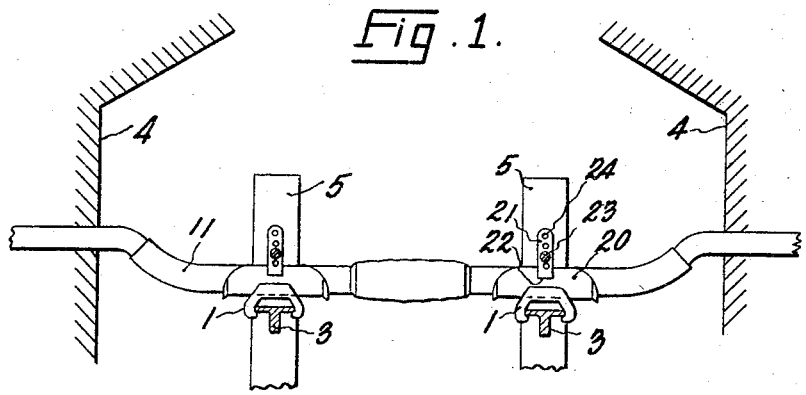
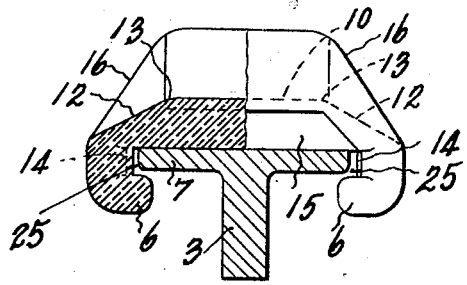
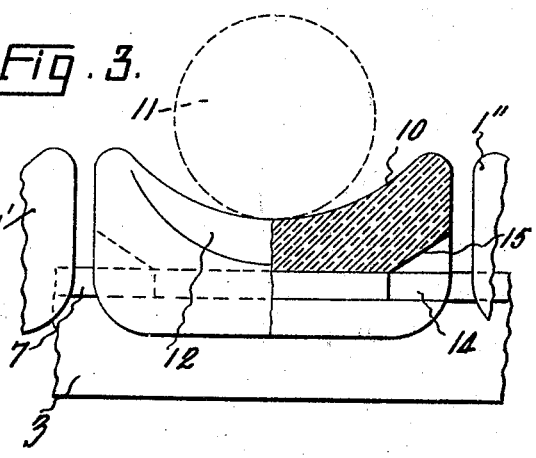
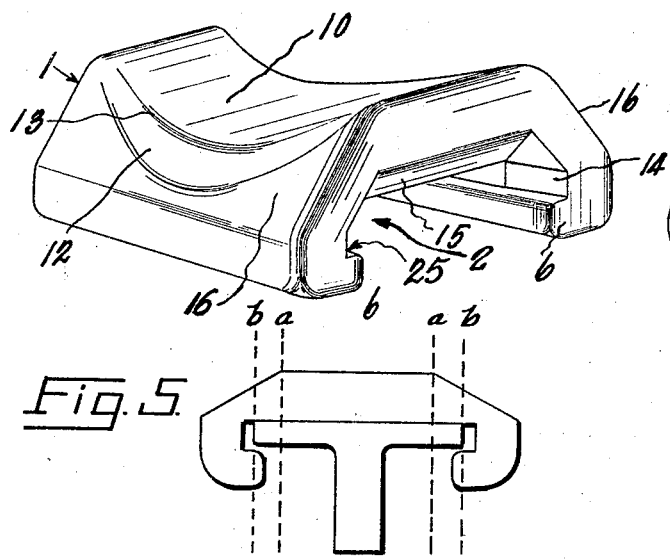
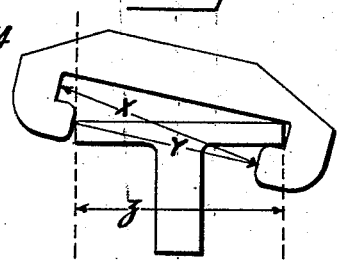
INVENTOR.
WILLIAM B. ELMER
AND CHARLES F. AVILA
BY Chapin & Neal
ATTORNEYS.

Patented Jan. 3, 1933

1,892,798

UNITED STATES PATENT OFFICE

WILLIAM B. ELMER AND CHARLES F. AVILA, OF CAMBRIDGE, MASSACHUSETTS, ASSIGNORS TO CHARLES B. ELMER, OF WHITE PLAINS, NEW YORK

CABLE RIDER

Application filed August 3, 1931. Serial No. 554,806.

This invention relates to riders for receiving and insulating underground cables where they rest on supports or brackets in the manholes which are provided at intervals to give access to the cables. In practice a plurality of cables rest side by side on the brackets and a rider is provided for each cable to keep the cables in properly spaced relation and out of contact with the bracket. Due to the expansion and contraction of the cables from temperature changes there is a substantial sliding movement of the cables in the riders and the riders are frequently tipped from the brackets, permitting the cables to come in contact with brackets. This tendency of the riders to leave their position on the brackets is accentuated when the cables are roughly coated with cement, the irregularities of which engage the edges of the riders and transmit the movements of the cables directly to the riders. It has been proposed to secure the riders to the brackets by dovetailed grooves, but in such a construction a rider can only be removed by slipping it from the end of the bracket requiring removal of all intermediate riders as well.

It is an object of our invention to provide a rider which shall be locked to the bracket against direct thrust of the cable but which can be replaced without disturbing adjacent riders and in which any tendency of the rider to tip and become displaced by any vertical component of the thrust is prevented. Other and further objects will be apparent from the following specification and claims.

In the accompanying drawing which illustrates one embodiment of our invention:

Fig. 1 is a general view showing the manner of using the device;

Fig. 2 is an end view of the rider, partly in section, on a larger scale;

Fig. 3 is a side view partly in section;

Fig. 4 is a perspective view of the rider;

Fig. 5 is a diagrammatic view for illustrating clearly the relative width of the cable receiving seat and the support on which the rider rests; and Fig. 6 is a similar diagram illustrating the way in which the rider may be disengaged from the support by hand.

As shown in the drawing, our improved rider comprises a block 1 of porcelain, bakelite, hard rubber, or other suitable insulating material formed on its underside with a channel 2 adapted to be engaged on a flanged support or bracket 3, preferably of T-shaped cross section as shown, extending from and suitably supported on a wall of the manhole 4 as by an upright 5. The channel 2 is undercut at each lateral side thereof with hook grooves 25 to provide inwardly extending lips 6, adapted to engage beneath opposite edges of the flange 7 of the bracket. The lips 6 are spaced apart just sufficiently to permit one of the lips to clear its adjacent edge of flange 7 when the other lip is hooked tightly about the opposite edge of said flange. This permits mounting or removal of the rider without disturbing the adjacent riders which may be mounted on the same bracket, as indicated at 1' and 1'' in Fig. 3. As shown in Fig. 6 the distance ($x$) from the edge of each lip 6 to the bottom of the opposite hook groove 25 is slightly greater than the width ($z$) of the flange 7 and the distance ($y$) between the lips 6 is less than the width ($z$) of said flange 7 and thus the lips 6 lock the rider to the bracket in every position except the extreme in either transverse direction. The maneuver for disengaging the rider is illustrated in Fig. 6.

The rider is formed on its upper side with an arcuate seat 10 in which the cable (designated generally at 11) rests. In order to prevent the weight of the supported cable from tipping the rider under any downward component of thrust with consequent danger of displacement of the rider from the bracket if the downward thrust occurs when the rider is positioned in either of its extreme transverse positions on the flange 7, the seat 10 is made shorter transversely of the bracket than the width of said supporting flange 7. For this purpose the horizontal arcuate seat portion 10 terminates at each side edge 13 thereof in downwardly sloping surfaces 12 (conically curved as shown) which merge into flattened sloping surfaces 16 (see Fig. 4). It will be observed that in any position of the rider on the bracket support, vertical planes passing through the side edges 13 of seat 10 will fall within the outside lateral edges of the flange 7 as clearly shown in Fig. 2. The lateral edges or corners of the flange 7 therefore, never present a fulcrum on which a downward thrust on the seat can exert a leverage tending to tilt the rider off the bracket, such as might occur if a downward thrust on the seat could be exerted in a vertical line falling outside of one of the edges of flange 7. The relation between the edges 13 of the seat 10 and the edges of the flange 7 is shown in Fig. 5 wherein (a) indicates vertical lines through the corners 13 and (b) vertical lines through the edges of flange 7.

In order to minimize the possibility of breakage of the rider from the twisting of the cable on the seat, the bottoms of the hook grooves 25 are flared outwardly at each end of the rider (as indicated at 14) permitting a slight pivotal action of the rider in a horizontal plane on the flange 7. The ends of the rider may be formed with an underside bevel as at 15 to facilitate handling of the rider. The structure is lightened by sloping the sides, adjacent the conical surfaces 12, inwardly as at 16. All corners are preferably rounded to minimize breakage.

To increase the freedom of slippage of the cables in the seat 10, which the roughness of the usual cement coating tends to prevent, the cable may be provided at that point with a protector 20 formed of flexible zinc or lead which is held in position around the cable by a metal strap 21 passing around the cable and extending through slots 22 formed in the sides of the protector 20. The ends of the strap are held clamped together by a bolt 23 passed through a registering pair of a series of holes 24 formed in the ends of the straps. The protector 20 directly protects the cable from wear and by decreasing the slipping resistance decreases the tendency of the cable to abrade the seat.

We claim:

1. In combination with a support, of a rider for receiving a cable, which comprises a block of insulating material adapted to be positioned on the support, a longitudinal channel formed on the underside of the block for engagement with the support and a transverse cable seat formed on the upperside of the block, the sides of the block being cut away sufficiently to position the cable contacting edges of the seat between the vertical planes passing through the edges of the support, when the rider is positioned on the support.

2. In combination with a support, of a rider for receiving a cable, which comprises a block of insulating material adapted to be positioned on the support, a longitudinal channel formed on the underside of the block for engagement with the support and an arcuate cable seat formed on the upperside of the block, the sides of the block being cut away sufficiently to position the edges of the seat between the vertical planes passing through the edges of the support, when the rider is positioned on the support.

3. In combination with a support, of a rider for receiving a cable, which comprises a block of insulating material adapted to be positioned on the support, a longitudinal channel formed on the underside of the block for engagement with the support, lips projecting inwardly from the sides of said channel for engagement beneath the edges of the support, the distance between said lips being sufficient to permit one of the lips to be passed over one edge of the support when the opposite lip is closely engaged about the opposite edge of the support, and a transverse cable seat formed on the upper side of the block.

4. In combination with a support, of a rider for receiving a cable, which comprises a block of insulating material adapted to be positioned on the support, a longitudinal channel formed on the underside of the block for engagement with the support, the top and sides of said channel being flared outwardly at the ends of the channel lips projecting inwardly from the sides of the channel for engagement beneath the edges of the support, the distance between said lips being sufficient to permit one of the lips to be passed over one edge of the support when the opposite lip is closely engaged about the opposite edge of the support, and a transverse cable seat formed on the upper side of the block.

5. In combination with a support, of a rider for receiving a cable, which comprises a block of insulating material adapted to be positioned on the support, a longitudinal channel formed on the underside of the block for engagement with the support, lips projecting inwardly from the sides of said channel for engagement beneath the edges of the support, the distance between said lips being sufficient to permit one of the lips to be passed over one edge of the support when the opposite lip is closely engaged about the opposite edge of the support, and a transverse cable seat formed on the upper side of the block, the sides of the block being cut away sufficiently to position the cable contacting edges of the seat between the vertical planes passing through the edges of the support, when the rider is positioned on the support.

6. In combination with a support, of a rider for receiving a cable, which comprises a block of insulating material adapted to be positioned on the support, a longitudinal channel formed on the underside of the block for engagement with the support, the top and sides of said channel being flared outwardly at the ends of the channel, lips projecting inwardly from the sides of the channel for engagement beneath the edges of the support, the distance between said lips being sufficient to permit one of the lips to be passed over one edge of the support when the opposite lip is closely engaged about the opposite edge of the support, and a transverse cable seat formed on the upper side of the block, said seat having a substantially cylindrical surface with side portions formed with downwardly flaring conical surfaces, the junctures of the conical surfaces and the cylindrical surface being positioned between the vertical planes passing through the edges of the support, when the rider is positioned on the support.

7. In combination with a support, a cable receiving rider which comprises a block of insulating material adapted to be positioned on the support, a longitudinal channel formed on the underside of the block for engagement with the support and a transverse cable seat formed on the upperside of the block, the width of said seat being less than the width of the support so that the portion of the block in contact with the cable is confined between the vertical planes passing through the edges of the support when the rider is positioned on the support.

8. In combination with a support generally T-shaped in cross section, a cable receiving rider which comprises a block of insulating material formed on its upper side with a cable receiving seat and on its underside with a channel for engagement with said support, said channel having at each lateral side thereof a hook groove with inwardly projecting lips, the width of the engaged portion of the support being greater than the distance between the edges of said lips and less than the distance between the edge of either lip and the bottom of the opposite hook groove, and said cable receiving seat on the upperside of the block having an extent transversely of said support, which is less than the width of the engaged portion of the support.

9. In combination with a support, a cable receiving rider comprising a block of insulating material formed on its underside with a channel undercut at its sides to form inwardly extending lips adapted to engage beneath the edges of said support to hold the rider on the support in all normal positions of the rider on the support, the opening to said channel being so related to the side walls of the undercut portions of the channel as to permit the rider to be engaged on, and removed from, the support when the rider is turned to an abnormal position with respect to the support.

10. A rider for receiving a cable, which comprises a block of insulating material provided on its underside with a channel and on its upperside with a cable receiving seat positioned in a direction transverse to said channel, the length of said seat in said transverse direction being less than the minimum transverse width of the channel.

11. A rider for receiving a cable, which comprises a block of insulating material provided on its under side with a channel, the sides of said channel being undercut to form inwardly projecting lips, and a cable receiving seat formed on the upperside of the block and positioned in a direction transverse to said channel, the length of said seat in said transverse direction being less than the minimum distance between the edge of either lip and the opposite undercut face of the channel.

In testimony whereof we have affixed our signatures.

WILLIAM B. ELMER.
CHARLES F. AVILA.